O. C. BURNHAM.
CROSSCUT SAW SET.
APPLICATION FILED JUNE 16, 1910.
1,005,688.
Patented Oct. 10, 1911.
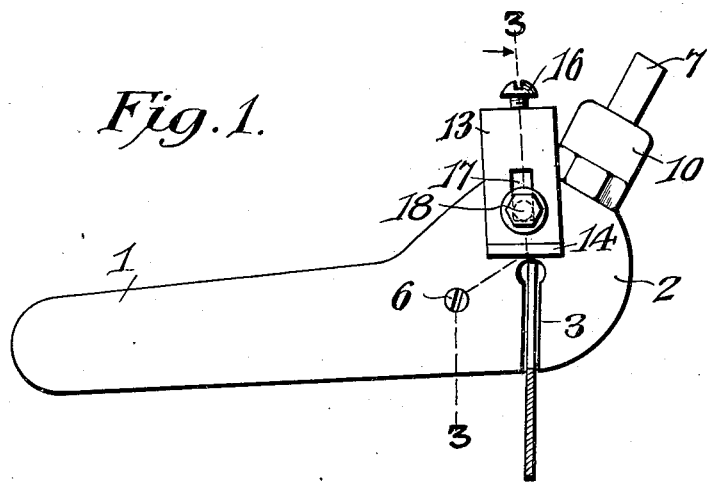
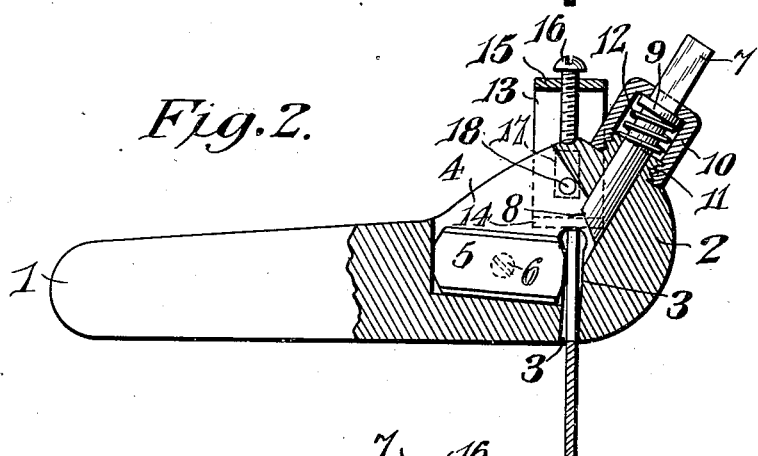
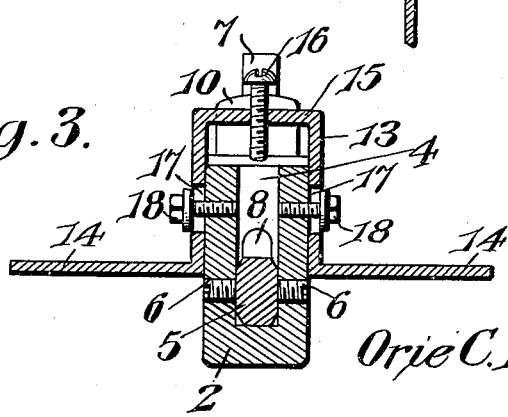
Orie C. Burnham, Inventor
Witnesses
By
Attorney
COLUMBIA PLANOGRAPH CO., WASHINGTON, D. C.

UNITED STATES PATENT OFFICE.

ORIE C. BURNHAM, OF PORTLAND, OREGON.

CROSSCUT-SAW SET.

1,005,688.     Specification of Letters Patent.     Patented Oct. 10, 1911.

Application filed June 16, 1910. Serial No. 567,328.

*To all whom it may concern:*

Be it known that I, ORIE C. BURNHAM, citizen of the United States, residing at Portland, in the county of Multnomah and State of Oregon, have invented a new and useful Crosscut-Saw Set, of which the following is a specification.

This invention relates to improvements in saw sets and the object of the invention is to provide a simple and substantial tool for use in setting the teeth of cross cut saws which may be easily operated and which will accomplish the desired results in an efficient manner.

A further object of the invention is to provide a saw set which may be used for a long period of time without requiring the provision of any new parts and which may be readily shifted along the saw blade to act on the teeth successively, and will be provided with an efficient gage by which the extent to which the tool may be lowered over the saw teeth may be regulated according to the set desired to be given to the teeth.

All these objects, and such other incidental objects as will hereinafter appear, are attained in the use of the device illustrated in the accompanying drawings, and the invention consists in certain novel features of the same which will be hereinafter first fully described and then particularly pointed out in the appended claims.

In the drawings,—Figure 1 is a side view of my improved tool showing it in position upon a saw blade and in its preliminary position. Fig. 2 is a longitudinal sectional view showing the tool canted upon the saw so as to bring the anvil and the setting pin into the proper position to set the saw tooth. Fig. 3 is a transverse section taken on the line 3—3 of Fig. 1.

In carrying out my present invention, I employ a stock or body having a solid extended portion 1 constituting a handle, and an enlarged head 2 at one end of the said handle, a slot or notch 3 being formed in the body from the under side of the same near the extremity of the said head 2, as clearly shown.

The description of the parts as to position is to be considered as having reference to the usual working position of the saw set when held in the hand and in engagement with the saw teeth. There is a cavity 4 formed in the upper side of the stock or body and this cavity is in communication with the slot 3, the bottom of the cavity being slightly inclined with relation to the length of the stock, so as to support an anvil 5 in such position as to give the desired set to a saw tooth when the device is positioned as hereinafter described. The anvil is substantially rectangular in form and is of such width that it fits snugly between the side walls of the cavity 4, whereby it is held against rotation when the tool is in use, and it is secured positively in place, so as to be prevented from slipping across the slot or notch 3 by set screws 6 mounted in the body or stock 1 and bearing against the sides of the anvil, as shown most clearly in Fig. 3. The anvil may be readily dropped into position through the open upper portion of the cavity 4, and the front wall of the said cavity or chamber is so disposed as to merge into the front wall of the slot or notch 3. A setting pin 7 is mounted in the head 2 so as to extend diagonally downward and inward therethrough, as shown most clearly in Fig. 2, and the inner end of the pin has a beveled portion 8 adapted to extend parallel with the working face of the anvil so that when a blow is struck upon the pin, the saw tooth between the pin and the anvil will be bent from the plane of the blade and given the desired set. The setting pin is provided with an annular shoulder 9, and its outer end beyond the said shoulder is angular and engages an angular opening in a cap 10 whereby rotation of the pin is prevented. The cap 10 has a threaded engagement with a boss 11 on the head 2, so as to be secured firmly in its position, and, by its engagement with the collar 9 on the pin, prevents the pin from being unduly withdrawn from the head. The inner portion of the setting pin is cylindrical so that it will move easily within the head, and a spring 12 is coiled around the pin between the collar 9 thereon and the end of the boss 11 so as to normally hold the pin in its raised position, indicated in Fig. 2.

The tool is placed in position upon a saw blade, which is secured in any suitable or convenient form of clamp, by engaging the slot or notch 3 over the saw tooth, and in order to govern the extent to which the tool may be carried downward over the tooth, I provide a gage consisting of a central inverted U-shaped body 13 and arms or stops 14 projecting from the said central U-shaped body, the body and the arms projecting therefrom being an integral structure and formed from a suitable metallic strap or bar, as will be readily understood. The central body 13 extends over the body or stock 1, and in its shoulder 15 is mounted a set screw 16 adapted to bear against the top of the head 2 so as to adjust the gage toward and from the bottom of the stock, as will be readily understood. In the sides of the U-shaped portion 13 are longitudinal slots 17 through which set screws 18 are inserted into the stock so as to securely hold the gage in the position to which it may be adjusted. When the tool is placed over the saw blade, the under sides of the arms 14 will impinge against the extremities of the saw teeth and will thereby limit the downward movement of the stock relative to the saw teeth, as will be readily understood.

In using the tool, the saw blade is secured in any convenient form of clamp, as before stated, and the tool is fitted successively over the alternate teeth which are set in one direction. The saw is then removed from the clamp, turned end for end, and then again secured in the clamp, after which the tool is again brought into use and the remaining teeth of the saw set in the direction opposite to those previously acted upon. On placing the tool on the saw blade the handle portion of the body or stock is grasped by the hand of the user, say the left hand, and the tool is lowered on to the saw by so directing it that the saw teeth will enter the slot 3 until further movement is arrested by the stops 14 engaging the top of the saw teeth. The device is readily positioned with relation to the tooth to be set by observing the teeth through the open end of the cavity 4, this cavity being directed toward the eyes of the operator and being sufficiently extensive lengthwise of the device to permit the ready observance of the saw tooth when positioned with relation to the anvil and between the same and the beveled end of the setting pin, which, with relation to the eyes of the beholder is on the remoter side of the saw tooth. Now, by means of a hammer or other tool grasped in the right hand of the operator a blow is struck on the setting pin and the beveled end of the latter is driven against the tooth bending the tooth over against the active beveled face of the anvil. Before, however, this operation is performed the handle end of the tool is raised until the anvil face of the saw tooth is engaged by the anvil and the other face of the saw blade is engaged by the lower end of the slot 3, thereby gripping the saw and temporarily clamping the setting tool on to the saw prior to the striking of the blow on the setting pin, whereby accidental displacement of the tool is prevented and the proper setting of the saw tooth is established. It will be understood that the notch or slot 3 is somewhat wider than the thickness of the saw blade to permit such tilting of the tool and also to facilitate the application of the tool to the saw, and, furthermore, the end of the notch 3 remote from its open end is enlarged to permit the passing of the set teeth. As soon as a tooth is set the handle end of the tool is dropped sufficiently to release the tool from clamping relation with the saw blade, when the tool may be moved into proper relation to the next tooth to be set and the operation just described repeated.

The device is a hand tool and is made sufficiently massive so that the blows of the hammer on the setting pin are not transmitted appreciably to the hand of the user grasping the handle end of the tool.

The setting of the saw teeth is very expeditiously performed because of the visibility of the teeth being acted upon, and the device by a simple motion of the hand of the user is gripped immovably to the saw and then released therefrom, so that this part of the operation is expeditiously and certainly performed.

Furthermore, the tool is of extreme simplicity and therefore may be manufactured at small cost.

The anvil, when worn, may be removed and turned upon itself so as to present a new face to the pin when it is replaced within the chamber 4 of the stock or body and will, consequently, have about four times the life of the ordinary one-face or non-symmetrical anvil.

In adjusting the gage, the set screws 18 are slightly loosened and the screw 16 is then rotated so as to cause the gage to move up or down relative to the stock or body 1, and be thereby quickly brought to the desired position. The set screws 18 are then turned home so as to secure the gage in the position to which it has been adjusted.

The working parts of my tool are thoroughly protected by the stock or body, and yet the construction permits their ready removal should it be necessary to renew the same.

While I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described my invention, what I claim is:—

1. A saw set comprising a one piece body member formed at one end into a hand-hold and at the other end provided with a chamber opening toward the hand-hold and elongated in the direction of the length of the hand-hold, said body member also having a slot on the side remote from the open end of the chamber and merging into said chamber, an anvil adapted to be housed in said slot, and a setting pin mounted in the body member on the side of the chamber remote from the hand-hold, said setting pin being adapted to be projected across the slot where merging into the chamber into operative relation to the anvil.

2. A saw set comprising a stock having at one end a head or enlargement and with the other end formed into a handle, said stock having a chamber formed therein and opening toward the handle and also having a transversely disposed slot on the side remote from the chamber and merging thereinto, an anvil adapted to be housed in the bottom of said chamber with its working end adjacent the slot, removable means for locking the anvil in the chamber, a setting pin mounted in the stock on the side of the chamber remote from the handle, said setting pin being arranged at an angle to the length of the handle and having the end within the stock beveled and presented toward the anvil to be moved into traversing relation to the slot, yielding means for holding the pin in a normally inactive position, and means for preventing rotative movement of the pin.

3. A saw set having an elongated body member with one end formed into a handle and the other end formed into a head, the head portion being provided with a chamber elongated in the direction of the length of the handle and opening toward the latter and with a slot in traversing relation to the head end of the body portion and opening into the chamber in traversing relation thereto, an anvil adapted to be lodged in the chamber, and a setting pin in the head on the side of the chamber remote from the handle, the anvil and setting pin being visible within the chamber from the handle end of the saw set and the slot being of a width greater than the thickness of the saw to be set to permit the cramping of the saw set on the saw by a rocking movement transverse to the length of the saw.

4. A saw set comprising a body or stock having a solid extended portion constituting a handle, and an enlarged head at one end thereof, said head having a slot piercing the under side thereof for the purpose of receiving the saw teeth and having a cavity formed in the upper side and communicating with the slot, said cavity opening through the upper side of the body and elongated in the direction of the length of the handle, an anvil of substantially rectangular form fitted wholly within the cavity, the bottom of the latter being inclined to support the anvil in an inclined position, the slot in the head extending above the top side of the anvil when in position, and a setting pin arranged at an incline above and in front of the anvil.

5. A saw set comprising a stock having a slot in its under side near one end, a cavity formed in the upper side of the body and communicating with said slot, said cavity opening through the upper side of the body and elongated in the direction away from said slot, an anvil resting on the bottom of the said cavity and having its end working in the said slot, set screws mounted in the body and bearing against the sides of the anvil, and a setting pin mounted in the upper side of the stock and projecting from the end of the same.

6. A saw set comprising a body having a slot in its under side and a cavity in its upper side communicating with said slot, said cavity opening through the upper side of the body and elongated in a direction away from said slot, an anvil of substantially rectangular form fitted wholly within the said cavity and confined by the walls thereof but reversible to present a new face.

In testimony, that I claim the foregoing as my own, I have hereto affixed my signature in the presence of two witnesses.

ORIE C. BURNHAM.

Witnesses:
W. O. DAILEY,
L. E. THOMPSON.

---

Copies of this patent may be obtained for five cents each, by addressing the "Commissioner of Patents, Washington, D. C."